United States Patent [19]
Dillingham et al.

[11] 3,859,509
[45] Jan. 7, 1975

[54] EMBOSSED CARD READING AND IMPRINTING APPARATUS

[75] Inventors: Edward Dillingham, Pacific Palisades; John H. Humphrey, Los Angeles, both of Calif.

[73] Assignee: Data Source Corporation, El Segundo, Calif.

[22] Filed: Apr. 23, 1973

[21] Appl. No.: 353,931

[52] U.S. Cl............... 235/61.9 R, 101/269, 200/46, 235/61.11 C, 340/149 A
[51] Int. Cl......... G06k 1/22, G06k 7/04, B41f 3/04
[58] Field of Search...235/61.11 E, 61.11 D, 61.12 N, 235/61.7 B, 61.9 R, 61.9 A, 61.11 C; 200/46; 340/149 A; 222/2; 340/172.5; 101/269

[56] References Cited
UNITED STATES PATENTS

| | | | |
|---|---|---|---|
| 2,977,024 | 3/1961 | Harris | 222/2 |
| 3,436,736 | 4/1969 | Platt | 340/172.5 |
| 3,470,358 | 9/1969 | Sallach | 235/61.11 C |
| 3,629,834 | 12/1971 | Randall | 340/149 A |
| 3,665,161 | 5/1972 | Oberhart | 235/61.7 B |
| 3,671,717 | 6/1972 | Bieser | 235/61.7 B |
| 3,714,398 | 1/1973 | Brock | 235/61.11 C |
| 3,752,074 | 8/1973 | White | 101/269 |

*Primary Examiner*—Daryl W. Cook
*Assistant Examiner*—Robert M. Kilgore
*Attorney, Agent, or Firm*—Stanley A. Becker

[57] ABSTRACT

The apparatus includes facilities for reading an embossed card and for transmitting to a computer at a remote location signals corresponding to the embossed data as well as other selected variable data. Upon receiving an authorization signal from the computer, imprinting facilities can be actuated to imprint a sales invoice. Interlocks are provided to prevent tampering by sales personnel and include a card lock assembly, an authorization symbol imprinting assembly, and a dollar amount switch lock. In normal operation, the apparatus cannot be made to imprint unless the transaction is authorized by the remote computer.

18 Claims, 14 Drawing Figures

EMBOSSED CARD READING AND IMPRINTING APPARATUS

This invention relates to an optical reading and imprinting apparatus and system. More particularly, this invention relates to apparatus and a system for optically reading indicia on credit cards, for obtaining credit authorization for a credit transaction and for automatically imprinting a sales invoice with the requisite data to complete the credit transaction.

Heretofore, credit card reading apparatus and credit authorization systems, such as disclosed in copending application Ser. No. 241,180, filed Apr. 5, 1972 and assigned to the assignee herein, have required that once credit authorization is obtained, the customer's credit card must be removed from the reading apparatus and inserted into a conventional imprinter for imprinting the desired data onto a sales invoice. Such an operation not only requires two pieces of equipment and is time consuming and cumbersome, but also permits fraudulent use by unscrupulous sales personnel, since it permits over-riding or tampering with the credit authorization system, thereby hindering the full effect thereof. For example, credit authorization could legitimately be obtained for a transaction of a specified amount, but the sales clerk may then set the imprinter to charge an amount over and above that which was authorized. Additionally, a sales clerk may receive authorization for a good credit card placed in the optical reading apparatus and then substitute a bad credit card when the imprinting of the sales invoice is accomplished. Customarily, merchants have a floor credit limit imposed by the card issuer which requires that authorization be obtained from the issuer for any sale involving an amount above that limit. This requires that the merchant call the issuer's data bank, or that credit authorization be obtained by using apparatus such as described in the aforementioned application Ser. No. 241,180. In either event, an authorization code, generally consisting of a two digit number, is given or transmitted to the merchant for recording on the sales invoice to indicate that the transaction was authorized by the card issuer, thus relieving the merchant of liability. The authorization code is determined in such a manner that it would not be possible for a merchant to arbitrarily select two digits as the authorization code without in fact calling the card issuer as required. However, a sales clerk may place an authorization code obtained from an authorized transaction on the imprinted sales invoice of an unauthorized transaction. While this can be subsequently detected, it is difficult and time consuming to do so.

The present invention is directed to an apparatus and system for overcoming the foregoing problems.

SUMMARY OF THE INVENTION

The subject apparatus and system includes optical reading facilities which optically read the embossed indicia on a credit card and then transmit the data to a remote computer at a central data bank along with other fixed or variable data. If the central data bank authorizes the credit transaction, a signal is sent back to the subject apparatus and allows operation of imprinting facilities for imprinting a sales invoice. However, if the transaction is not authorized, the sales invoice cannot be imprinted. This is accomplished by the use of various interlocks and controls. Thus, the apparatus provides for the transmission of the necessary data for credit authorization and limited descriptive billing, imprints a sales invoice and by appropriate interlocks and controls insures compliance by sales personnel with the system requirements. The apparatus has a variable data keyboard, which normally includes, among other things, dollar amount switches, and switches used to identify the card issuer, i.e., Master Charge, Bank Americard, American Express, etc. In operation, a credit card is inserted into a slot or recess positioned beneath a movable carriage. The variable data is set on the keyboard to identify both the card issuer and the dollar amount of the sale. The apparatus is then started by pressing a button. Upon starting, the keyboard becomes locked to prevent changing the dollar amount of sale. Simultaneously therewith, the credit card becomes locked in place to prevent removal and substitution of another card. The carriage traverses the credit card and reads the embossed indicia thereon, transmitting it to the central data bank in accordance with the system described in copending application Ser. No. 241,180. If the credit card holder has good credit and the card has not been reported lost or stolen, a credit authorization will be received by the apparatus. During the time interval that the data is transmitted from the apparatus until credit authorization is received, the carriage is stopped. If credit authorization is given, an authorization number will be displayed to the operator. At this time, the operator inserts a sales invoice above the credit card, if he has not already done so while waiting for the credit authorization. Again, the start button is depressed and the carriage begins to return to its original position. In response to this return movement, the imprinting facilities imprint on the sales invoice the desired data including the credit card holder's name and number, sales price, merchant's name and address, and any other information desired. Also, a credit authorization symbol is automatically imprinted on the sales invoice. The carriage then stops when it returns to its original position in preparation for another transaction. At this time, the operator will remove the credit card and imprinted sales invoice and will copy the authorization number displayed onto the invoice to indicate an authorized credit transaction.

In the event that credit authorization is not received for a particular transaction, a signal will be sent to the apparatus indicating that there is no authorization. In this instance, the apparatus is responsive to a no authorization signal and cannot be made to imprint by pressing the start switch. The operator then must remove the sales invoice if it has already been inserted and push the start button to return the carriage to the left. The credit card cannot be removed until this is done. The carriage will not return to the left until the sales invoice is removed, thus no imprinting can take place. A manual override control allows an invoice to be imprinted, if desired, but without an authorization symbol.

Other advantages of the present invention will be apparent from the following detailed description when considered in conjunction with the following detailed drawings, which drawings form a part of the specification. It is to be noted, however, that the drawings illustrate only a typical embodiment of the invention and are therefore not to be considered limiting of its scope, for the invention may admit to other equally effective embodiments.

DESCRIPTION OF THE INVENTION

Figure 1:
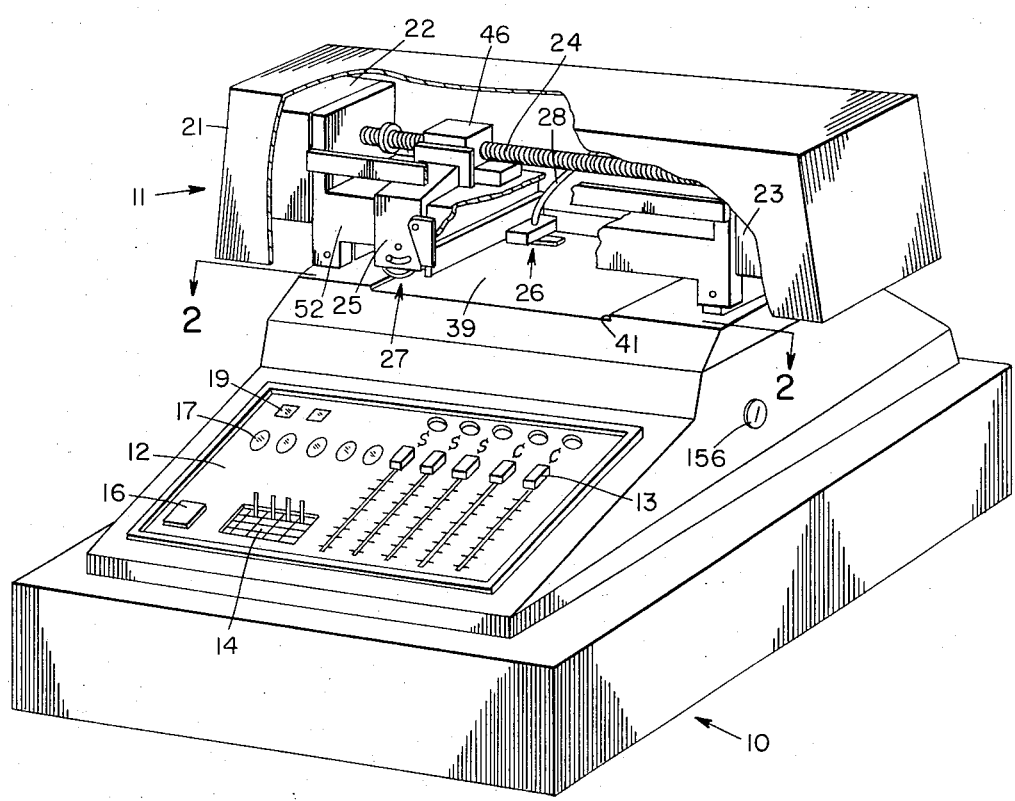
FIG. 1 is an isometric view of the apparatus for optically reading and imprinting in accordance with the principles of this invention with the carriage cover being partially cut away.

Referring to FIG. 1, there is shown an optical reading and imprinting apparatus in accordance with the principles of this invention, having a base assembly generally designated as 10 and a carriage assembly generally designated as 11. The base assembly includes a keyboard 12 on which variable data may be set on the apparatus. Keyboard 12 includes a plurality of switches 13 for setting the dollar amount of sales for a particular transaction, and a plurality of switches 14 for identifying the card issuer such as, for example, American Express, Bank Americard, Master Charge, or the like. Also on the keyboard is a start switch 16 and a plurality of displays or indicator lights, generally designated as 17, to indicate such things as "authorization," "no authorization," "repeat scan," and any other indicator that may be necessary or desirable, depending upon the particular use of the apparatus.

The keyboard also has a credit authorization number display 19 which displays a plurality of digits. These digits indicate that an authorization code has been given and is to be recorded by the operator on the sales invoice when the transaction is completed. Alternatively, a printing device can be incorporated in the carriage to automatically imprint the authorization number on the sales invoice during the imprinting operation. Also, an authorization symbol printing device is actuated upon receipt of credit authorization from the data bank to imprint an authorization symbol on the sales invoice, as is described more fully hereinafter.

The carriage assembly 11 is housed by a cover 21, and includes a first motor 22 and a second motor 23 which alternately rotate a drive screw 24 to move a carriage generally designated as 25. When motor 23 is energized, the drive screw moves the carriage 25 from left to right to accomplish reading of the credit card. During this time, motor 22 is de-energized. When motor 22 is energized, motor 23 is de-energized and the carriage 25 moves from right to left and the imprinting operation is accomplished. While a single reversible motor may also be used, it has been found that two separate shaded pole motors provide more accurate control. The carriage starting position for the operation of the apparatus as described herein is at the left, and the credit card reading operation is performed as the carriage moves from left to right, with the imprinting operation being performed when the carriage moves from right to left. However, the apparatus may easily be arranged such that the carriage starting position is at the right instead of the left.

Connected to the carriage 25 is a pivotable read head assembly 26 and a pivotable imprinter assembly 27, both of which are described more fully hereinafter. A bundle of light conducting fibers 28 has one end thereof connected to a read head in the read head assembly 26 to direct light to and from the embossed indicia on the credit card to be read. The other end of the bundle of light conducting fibers 28 is connected to light responsive facilities which determine the identify of the characters which are scanned. The method of reading and identifying characters forms no part of this invention, but is described more fully in the aforementioned application Ser. No. 241,180, and in copending application Ser. No. 229,922, assigned to the assignee hereunder. While the read head apparatus and method as described herein are referred to as being optical in nature, other means for identifying characters could likewise be used in accordance with the principles of this invention.

Figure 2:
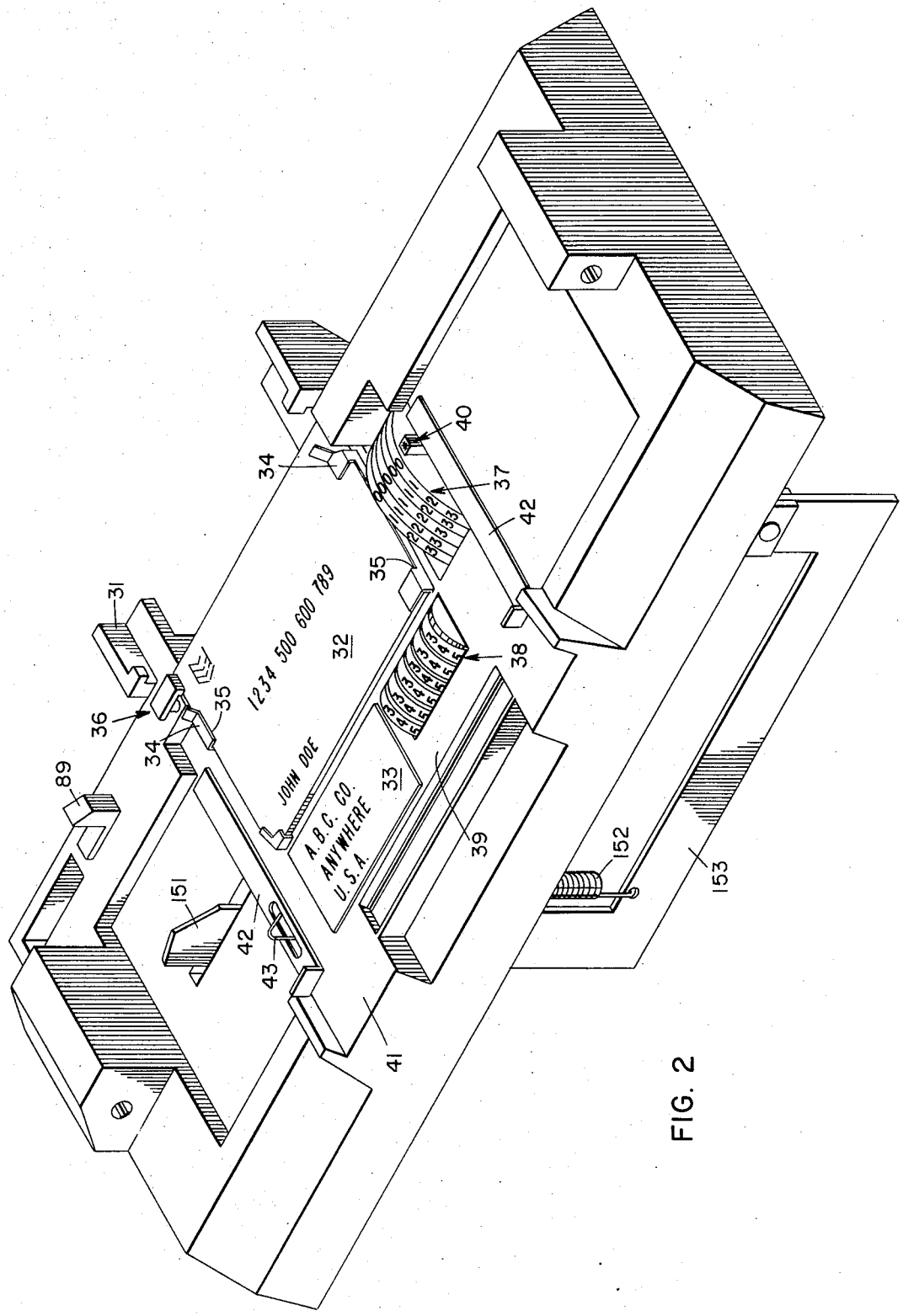
FIG. 2 is an isometric view of a portion of the base assembly taken along line 2—2 of FIG. 1.

Referring now to FIG. 2, a portion of the base assembly 10 is shown with the carriage assembly 11 being removed therefrom to show the platen 39. At the back of the base assembly 10 guide members 31 are provided to facilitate insertion of a credit card 32 into the apparatus to rest on the platen 39. The card 32 is inserted between a pair of guides 34 which hold the card in its proper position in the platen. Guides 34 are recessed at 35 in order to avoid contact with the read head assembly 26. A credit card locking assembly 36 is actuated in response to movement of the carriage 26 for securely locking the credit card 32 to the platen during the reading and imprinting operations. Thus, a credit card cannot be removed and replaced once a cycle of operation of the apparatus is initiated.

Figure 3:
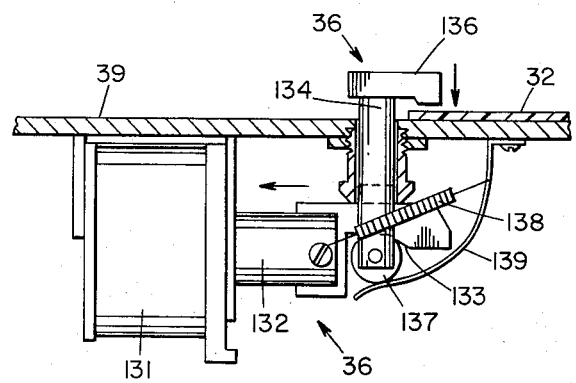
FIG. 3 is a view illustrating the credit card locking assembly.

As shown in FIG. 3, the credit card locking assembly 36 includes a solenoid 131 having an armature or plunger 132 with a cam 133 attached thereto. Mounted through a hole in the platen for vertical movement is a rod 134 having a projecting head 136 connected to its upper end for engaging the credit card, and a roller 137 connected to its lower end for engaging the cam 133. When solenoid 131 is de-energized, the plunger 132 is extended as shown in FIG. 3, biased in this position by spring 138. When the start button is pushed to begin the reading operation, the solenoid 131 is energized to retract the plunger 132, camming the rod 134 down and locking or clamping the credit card between the platen 39 and the head 136. The credit card remains clamped until the carriage returns to its start position, whereupon the solenoid 131 is de-energized, allowing the plunger 132 to be extended by spring 138. A leaf spring 139 is provided to bias the roller 137, rod 134 and head 136 upwardly. An alternate embodiment to lock the credit card in place would be to provide a pin or rod (not shown) near the upper edge of the credit card to block the card and prevent its removal until a complete cycle of operation is completed. This can be accomplished by connecting the pin or rod by appropriate brackets or linkages to lock bar 153, which is described more fully hereinafter, so that when the lock bar 153 is up the credit card is locked, and when the lock bar 153 is down the credit card is unlocked.

Figure 4:
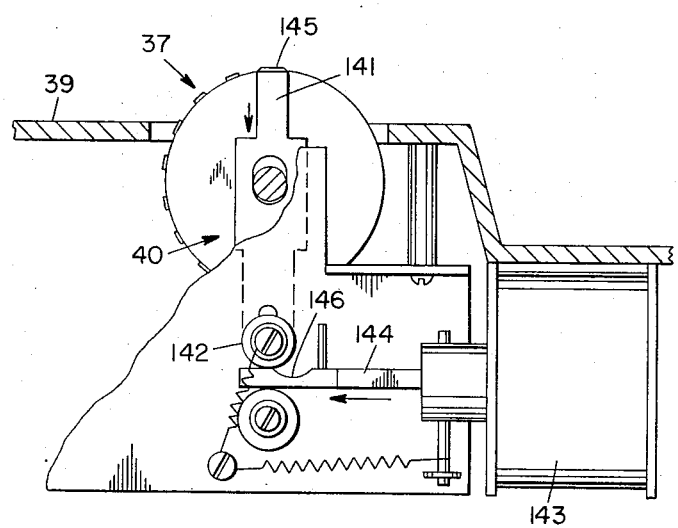
FIG. 4 is a view illustrating the credit authorization symbol imprinting assembly.

To the right of the credit card 32, as shown in FIG. 2, is positioned a plurality of imprinting wheels, generally designated as 37. The imprinting wheels 37 are connected by linkages, which are described more fully hereinafter, to the dollar amount keys 13 on the keyboard 12. Another set of imprinting wheels 38 is provided to print the date of the transaction. These are manually set each day. An embossed dealer data plate 33 is provided to imprint the merchant identifying name and number on a sales invoice. An authorization symbol imprinting assembly 40, shown in FIG. 4, is also provided to automatically imprint a symbol or character on a sales invoice to indicate authorization. This is in addition to the authorization numbers that are displayed at 19 on the keyboard 12 for the operator to write on the invoice. Use of the authorization symbol, which is machine-readable, permits easy sorting by machine of the authorized transactions from the unauthorized transactions. The authorization symbol imprinting assembly includes an arm 141 extending upwardly from the platen, and having a type symbol 145, such as an asterisk on its upper end. A roller 142 is mounted to the lower end of arm 141. A solenoid 143 having an armature or plunger 144 with a cam surface 146 formed on one side thereof is mounted adjacent to the arm 141 with the cam surface 146 in engagement with the roller 142. When solenoid 143 is de-energized, the plunger 144 is extended and the arm 141 is in its down position with the roller 142 engaging the curved cam surface. In this lowered position, the symbol 145 cannot imprint the sales invoice. When solenoid 143 is energized, the plunger 144 is retracted, as shown in FIG. 4, and the roller 142 and arm 141 are cammed upwardly so that the type symbol 145 is positioned to imprint the authorization symbol on the sales invoice. In an alternate embodiment the type symbol 145 is mounted or engraved on an imprinting wheel mounted coaxially with the dollar amount imprinting wheels 37. This authorization symbol wheel is normally positioned so that no character can be imprinted from it, but is rotated through a small angle when solenoid 143 is energized, so as to move type symbol 145 into the imprinting position. Because such a wheel might be jammed by an unscrupulous sales person, its position can be sensed by an additional switch. This is connected electrically so that the imprint motor 22 cannot start if the symbol is in the imprinting position and authorization has not been received.

Referring back to FIG. 2, the sales invoice is inserted in the apparatus through a front guide 41. A pair of spring guides 42 are provided to hold the sales invoice, not shown, in proper position with respect to the platen 39, credit card 32, merchant identification plate 33, and the imprinting assemblies 37, 38 and 40. A sales invoice switch 43 is also provided on the platen 39 to detect when a sales invoice is inserted for imprinting. when the invoice is inserted between guides 42 and the platen 39, the switch 43 is closed. When the switch 43 is closed, a credit authorization signal must be received by the apparatus before the carriage can move from right to left and imprint the sales invoice. If a signal is received indicating that authorization is not given, the sales invoice must be removed, thereby opening switch 43, before the carriage can return for another cycle of operation. This switch 43 prevents an operator from intentionally or inadvertently imprinting an invoice for an unauthorized sale. Switch 43 also prevents the read portion of the cycle from being initiated unless the invoice is removed from the platen.

Figure 5:
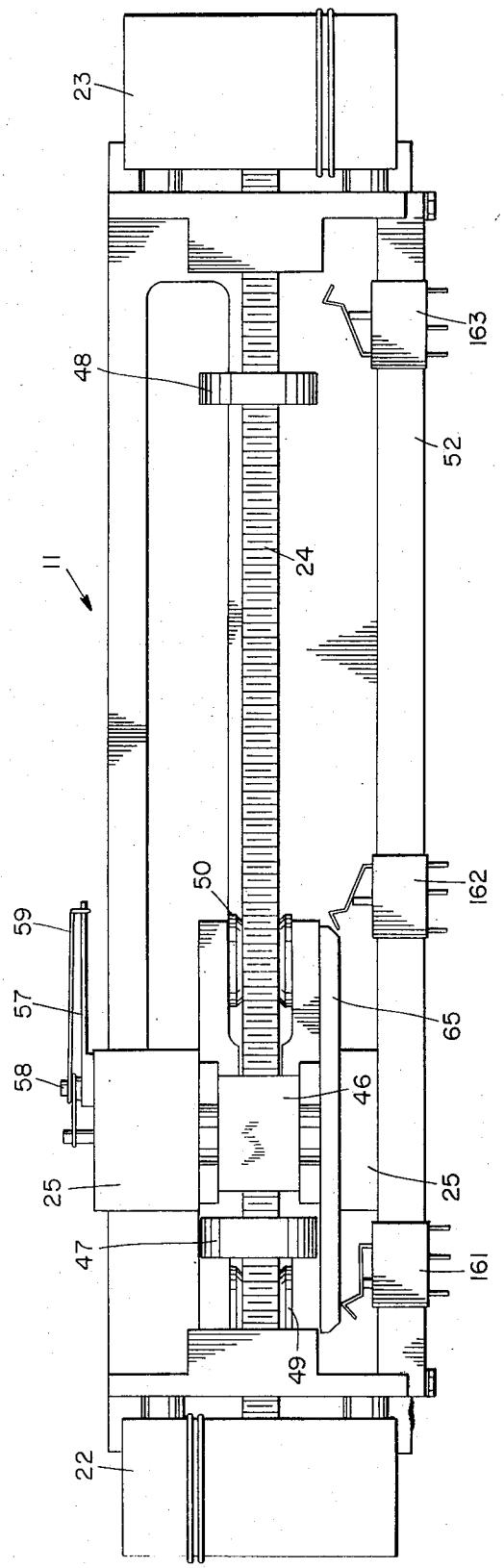
FIG. 5 is a plan view of the top of the carriage assembly shown in FIG. 1 with the cover removed.
Figure 6:
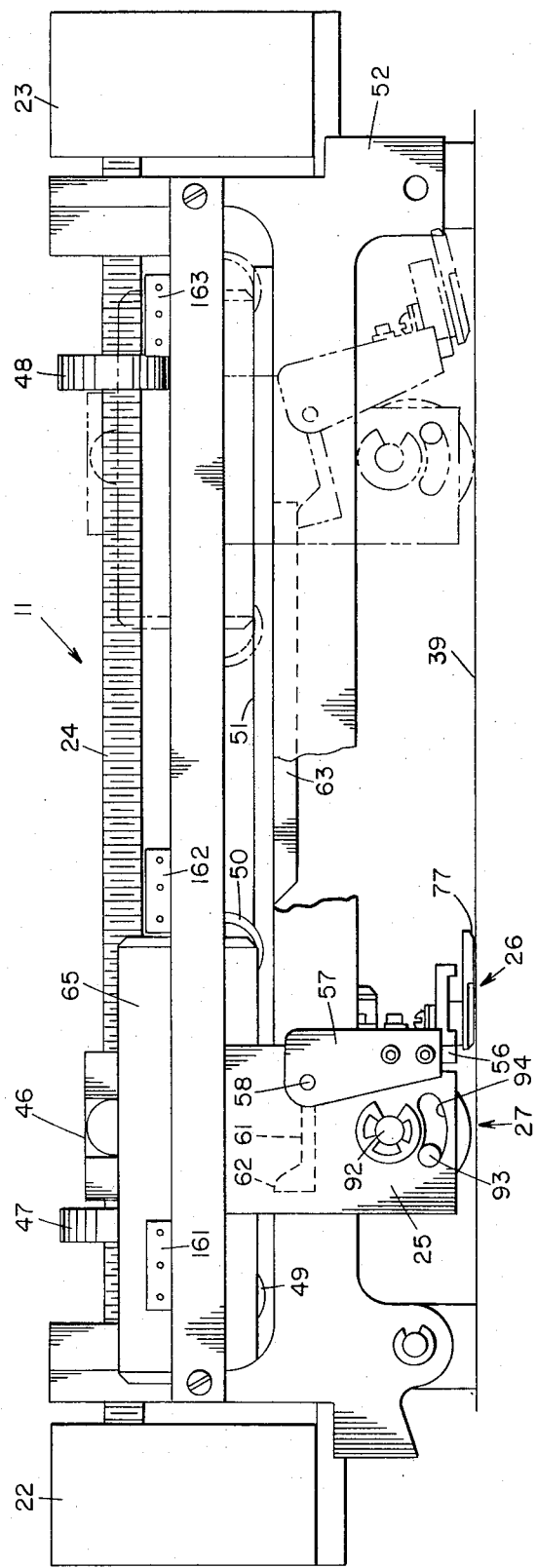
FIG. 6 is a side view of the carriage assembly shown in FIG. 5.
Figure 7:
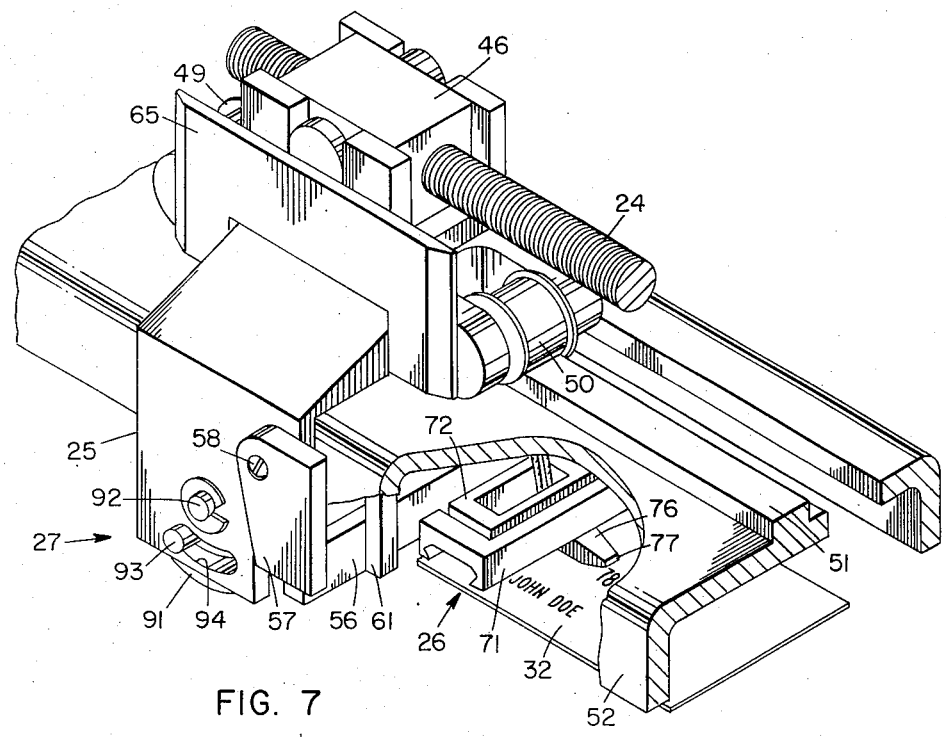
FIG. 7 is an enlarged isometric view of a portion of the carriage assembly shown in FIGS. 5 and 6.
Figure 9:
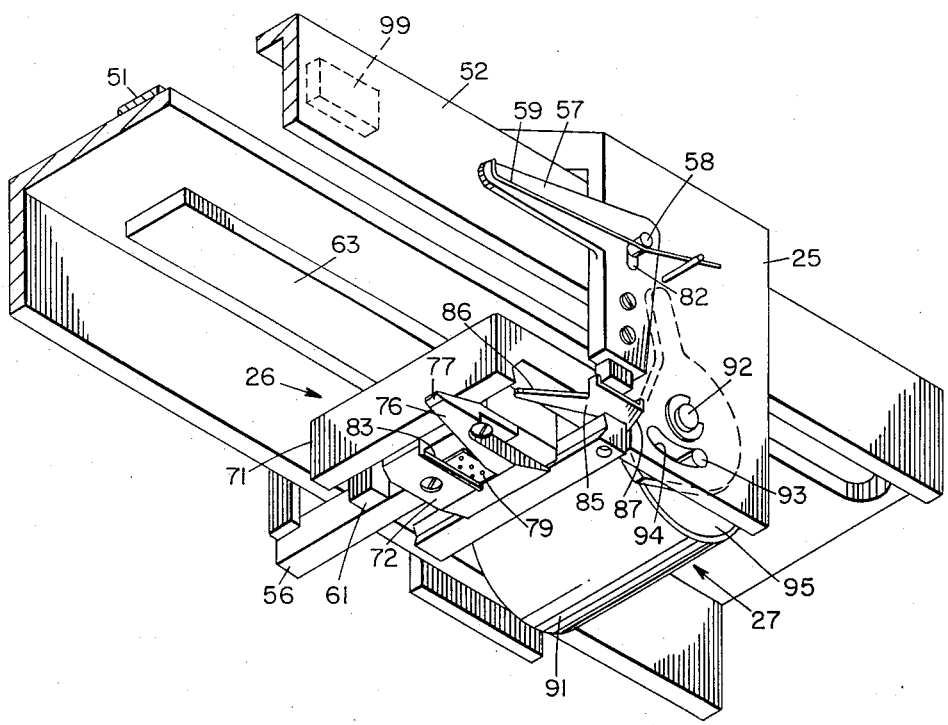
FIG. 9 is an enlarged isometric view of the carriage assembly further illustrating the read head assembly and the imprinter assembly.

Referring now to FIGS. 5, 6 and 7, there are shown views of the carriage assembly 11. The carriage 25 has an upright portion 46 having a threaded bore therethrough for receiving the drive screw 24. The travel of the carriage 25 can be adjusted by threaded stops 47 and 48 which are locked in the desired positions to the drive screw 24 by set screws. The carriage 25 has mounted for rotation thereto a pair of flanged rollers 49 and 50 which ride on a raised guide surface 51 of the carriage frame 52. The carriage 25 carries the read head assembly 26 which includes a support 56 which is connected to a pair of brackets 57, each having one end pivotally mounted at 58 to the carriage 25. The pivotal mounting of the read head assembly 26 permits the read head to remain in a position which is parallel to the credit card 32 during the reading operation, after which the read head assembly 26 is pivoted away from the platen 39 to avoid contact with the imprinting wheels 37 and 38 during travel of the carriage 25 to the right. The read head assembly 26 remains in an upward position during the imprinting operation to avoid contact with the sales invoice which would cause smearing thereof if the read head were permitted to remain in its horizontal position. This pivotal movement is accomplished by a pivot arm 61 which is attached to the support 56 of the read head assembly 26. Pivot arm 61 has an enlarged end portion 62 which engages a cam surface 63 formed in or mounted to the frame 52 as shown in FIGS. 6 and 9. The enlarged portion 62 of pivot arm 61 makes contact with the leading or left edge of cam surface 63 when the read head has completed its scan of the indicia on the credit card as it moves to the right. Upon contact of portion 62 against cam 63, the entire read head assembly 26 is pivoted upwardly about pivot point 58 out of engagement with the platen 39. The read head assembly 26 is held in this upward postion throughout its further travel to the right hand stop position. As the carriage 25 moves to the left, it is not desirable to permit the read head assembly 26 to return to its original position when the enlarged portion 62 of pivot arm 61 moves off of the left edge of cam 63. If this occurred, the bottom of the read head assembly 26 would wipe across the sales invoice and smear the sales invoice in the area in which it makes contact. To avoid this, the imprinter assembly 27 has facilities, described more fully hereinafter, which hold the read head assembly 26 pivoted upwardly for the remainder of the movement of the carriage back to its leftward position.

Figure 8:
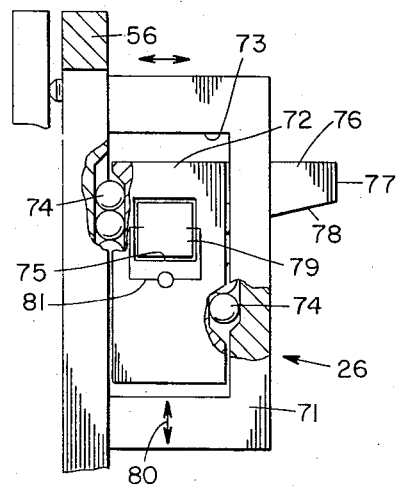
FIG. 8 is a top view of the read head assembly.

In order to obtain an accurate reading of the embossed characters on the credit card, it is desirable that movement be provided for the read head assembly 26 to accommodate different thicknesses of credit cards, different heights of the embossed characters on credit cards, and different positioning of the embossed information relative to one edge of the credit cards. As shown in FIGS. 7, 8 and 9, the read head assembly 26 includes a U-shaped member 71 which is mounted to support 56 and defines an opening 73 therebetween. A read head holder 72 which carries the optical read head 79 is mounted for movement within the opening 73 and has an opening 75 for receiving the read head 79 therein. The read head 79 is biased downwardly by a spring 81 so that the read head is urged down onto the embossed characters. However, the read head 79 can move upwardly against the spring 81 to accommodate various heights of embossed characters. The read head opening 75 preferably is square or rectangular for receiving a read head 79 of substantially similar shape. Other shapes that prevent relative rotation of the read head 79 in opening 75 can also be utilized. In this manner, perpendicular movement of read head 79 with respect to the card is assured. As shown in FIG. 9, to permit accommodation of credit cards of varying thicknesses, a slot 82 is formed in one or both of the brackets 57 at pivot point 58 to permit vertical movement of the entire read head assembly 26 when necessitated by a credit card of more than ordinary thickness. To position the read head 79 to read embossed characters that may be positioned differently with respect to one edge of a credit card, grooves are formed on each side of the read head holder 72, as shown in FIG. 8, for receiving bearings 74 to permit sliding movement of the holder 72 within the opening 73. The holder 72 has an arm 76 extending therefrom which has a tapered side portion 78 which guides on the first letter or character of the embossed indicia and moves the read head holder 72 in the opening 73 in the direction of arrow 80 to align it with the characters to be read. A tapered recess 83 is provided in the bottom of the read head holder 72 to receive and guide on the embossed characters to be read and accurately align characters with the read head 79. The arm 76 also has a tapered edge 77 to prevent gouging or shearing misaligned embossed characters. Should embossed characters be so mislocated that the tapered side 78 cannot guide on them, tapered edge 77 allows the read head assembly 26 to move up and over the embossed characters and avoid damaging the credit card. While bearings are shown to permit easy movement of the read head holder relative to the member 71, other facilities could also be utilized to permit such relative movement.

Figure 10:
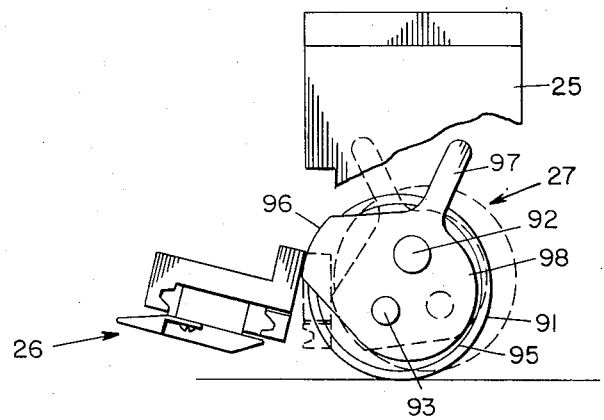
FIG. 10 is a side view further illustrating the read head assembly and the imprinter assembly.

It is desirable after each cycle of operation to return the read head holder 72 to a position where in the read head holder 72 abuts against the bottom of member 71 as viewed in FIG. 8 so that the tapered edge 78 of arm 76 will accurately align the recess 83 and read head 79 with the next characters to be read. Accordingly, as shown in FIG. 9, a lever 85 is pivotally mounted to member 71 and has one end 86 which engages the movable read head holder 72. The other end 87 hits a stop 89 (shown in FIG. 2) when the carriage returns to its start position at the left. The stop 89 engages lever 85 and the lever moves the read head holder 72 so that it is in its proper position to read the next credit card. Also, the stop 89 holds the read head assembly 26 in its upwardly pivoted position, as shown in FIG. 10, to allow a credit card 32 to be inserted under the read head. When the carriage 25 then begins to move for another cycle, the read head assembly 26 moves down into horizontal position on the credit card.

The imprinter assembly 27 shown in FIGS. 9 and 10 includes an imprinting roller 91 which freely rotates about cylinder 95. Extending through the cylinder is a shaft 92 and a pair of spring loaded axially aligned pins 93. Both the center lines of the shaft 92 and the pins 93 are positioned eccentric to the center line of cylinder 95. The ends of shaft 92 extend through apertures in the sides of carriage 25, and the ends of pins 93 extend through arcuate slots 94 formed in the sides of carriage 25 for providing predetermined oscillatory movement of imprinting roller 91. An imprinter actuator member 98 having two apertures therein is mounted over the shaft 92 and pins 93 at one end of the assembly. The actuator 98 has a cam portion 96 formed thereof for moving the read head assembly 26 and has an extending arm 97 projecting therefrom which engages stops mounted to the frame 52. When the arm 97 is positioned as shown in solid lines in FIG. 10, the imprinting roller 91 is down and positioned to contact the sales invoice to imprint the desired information thereon as the carriage 25 returns to its start position. It is to be noted that in this position the cam portion 96 engages read head assembly 26 and holds it up to avoid its smearing the invoice. During reading of the credit card, the arm 97 is positioned as shown in dotted lines in FIG. 10 with the imprinting roller 91 raised and the cam portion 96 out of engagement with the read head assembly 26. As shown in FIG. 9, an actuator stop 99 is mounted to the frame 52 to engage the arm 97 and move the imprinting roller 91 down into imprinting position. The imprinting roller 91 remains in this position during the imprinting operation as the carriage 25 returns to its starting position wherein another actuator stop (not shown) is mounted to the frame 52 to engage the arm 97 and raise the imprinting roller 91 in preparation for another cycle of operation.

Prior to beginning a cycle of operation of the apparatus, it is necessary that the operator set both the card issuer code on the keyboard switches 14 and the dollar amount on the keyboard switches 13. The switches 13 have a zero reference point wherein all of the switches 13 must be returned to zero prior to setting the new amount for another operation. This avoids the inadvertent running of a transaction using the dollar amount of a previous sale. When the operator or sales clerk moves the switches 13, he sets the figures on the imprinting wheels 37 as shown in FIG. 2 in a conventional manner. However, it is also important that the dollar amount be transmitted along with the other credit information to a central data bank to determine if credit authorization can be given for that particular sales transaction. For example, one may have a credit account limit of $500, but may not be able to charge over and above that amount. Thus, the dollar amount of the sale is considered to be very critical information. To simultaneously set the imprinting wheels 37 and enable transmission of the dollar amount information, rotor assemblies have been provided to supply electrical signals indicative of the dollar amount set by switches 13.

Figure 11:
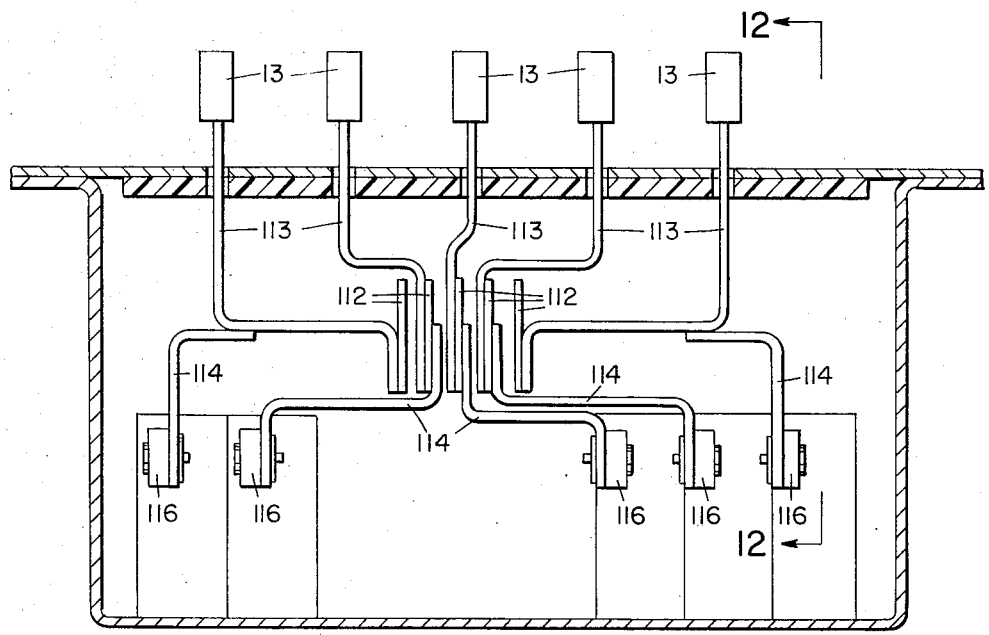
FIG. 11 is a front view illustrating the dollar amount switches and the rotor assemblies for transmitting an electrical signal indicative of the amount set on the switches.
Figure 13:
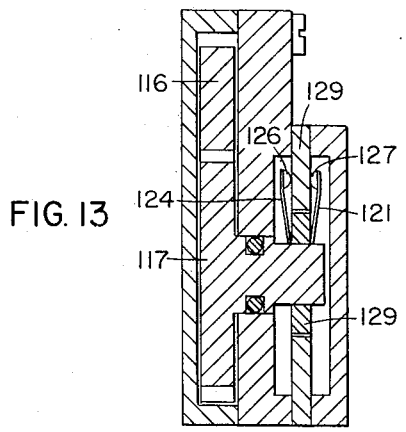
FIG. 13 is a cross-sectional view of the rotor assembly shown in FIG. 12 taken along line 13—13.
Figure 12:
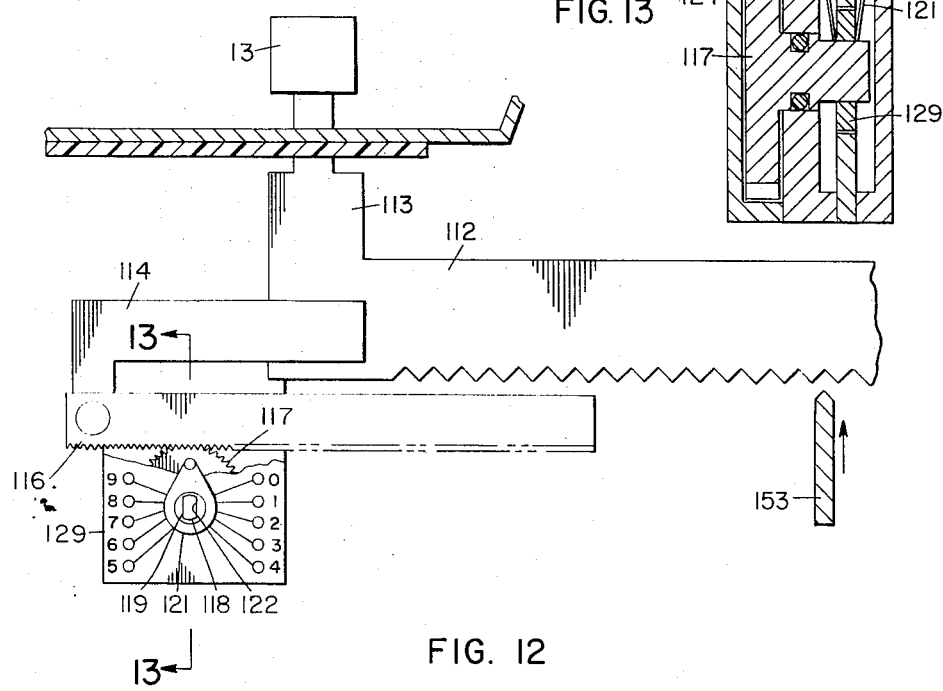
FIG. 12 is a side view of a dollar amount switch and rotor assembly taken along line 12—12 in FIG. 11.

Referring to FIGS. 11, 12 and 13, each slide switch 13 is connected by levers 113 to a rack 112. Each rack 112 is in turn connected to one wheel of the imprinting wheels 37. When a slide switch 13 is moved to indicate a particular value, the rack 112 affixed to the lever 113 is correspondingly moved to place that value on the imprinting wheels in a conventional manner. Attached to each of the levers 113 are switch activator brackets 114. Each bracket 114 is connected to another rack 116 which has movement corresponding to the movement of bracket 114 and its associated lever 113 and switch 13. Mounted for engagement with the teeth of each rack 116 is a pinion 117. As shown in FIG. 12, each pinion 117 has a shaft 118 having a portion thereof with flattened surfaces 119. A rotor 121 has an opening 122 therethrough shaped to receive the flattened portion of shaft 118 so that the rotor 121 rotates in conjunction therewith. As shown in FIG. 13, the rotor 121 includes a substantially U-shaped body 124 having wipers 126 and 127 positioned on the interior thereof. The wipers 126 and 127 are spaced apart to receive a circuit board 129 having a plurality of contact points formed thereon, each point being indicative of a different digit from 0 to 9. When the switch 13 is in the 0 position, the wipers 126 and 127 are positioned on the 0 contact of the printed circuit board 129. When the switch 13 is moved to another digit, such as the digit 4, the rack 116 is moved causing pinion 117 to rotate. This causes the rotor 121 to rotate moving the wiper arms 126 and 127 to the corresponding contact points for digit 4 on printed circuit board 129. By appropriate electrical connections, not shown, the switches 13 can thus provide an electrical output indicative of the amount of sale. This in turn can be transmitted to the central data bank as part of the necessary information needed to obtain credit authorization. Of course, other alternate switches which provide an electrical signal in response to a selected position could also be utilized.

Once the operator sets the dollar amount and other switches and presses the start button initiating reading of the credit card, it is desirable to prevent any further changes to the amount of sale until after imprinting is accomplished and the carriage is returned to its start position to await another cycle of operation. Accordingly, a cam 151 is provided extending upwardly through the plate 39, as shown in FIG. 2. The cam is biased by a spring 152 in its upward position. When the carriage is in its left or start position, imprinter roller 91 urges cam 151 downwardly. The cam is connected to a toothed lock bar 153 which passes transversely under racks 112 of the dollar amount switches 13. When the cam 151 is depressed, the lock bar 153 is held out of engagement with the racks 112, thus permitting the racks to be moved to set the desired dollar amount on the imprinting wheels 37. However, after the operator sets the dollar amount and begins the reading operation by pressing the start button 16, the carriage 25 moves to the right and the imprinter roller moves off of the cam 151, allowing it and the lock bar to move up locking all racks 112 from further movement, thus locking the dollar amount switches 13. The dollar amount switches stay locked until a full cycle of operation is completed and the carriage returns to its start position, whereupon the imprinting roller 91 will again urge cam 151 downwardly disengaging the lock bar 153 from the racks 112. Alternately, if desired, this locking function could be accomplished by a solenoid operated lock.

Occasionally, credit authorization may not be available from the central data bank, and the sales clerk will be required to obtain credit authorization by telephone. In such an instance, an interlock over-ride is provided to enable the carriage to return to the left and imprint a sales invoice in the event voice authorization has been received. To this end, a key operated manual over-ride switch 156 is provided. The switch 156 is normally opened to permit operation of the apparatus as previously described. However, when the key is inserted and turned, the switch 156 closes to permit the carriage 25 to move. Turning the switch 156 also removes power from the electronics and disengages the authorization symbol printing facilities 40 so that no authorization symbol can be imprinted on the sales invoice and likewise no transmissions can be made while the switch is in such a position. Ordinarily, the key will not be in the switch but will only be available for the occasional usage that will be required for voice credit authorization.

As shown in FIG. 5, three microswitches 161, 162 and 163 are mounted to frame 52 in such a manner as to close when a cam 65 mounted to carriage 25 moves by. Switch 161 controls motor 23, switch 162 controls the reading electronics, and switch 163 controls the motor 22. When the carriage is in its start position at the left, switch 161 is closed to permit motor 23 to be operated. As the carriage moves to the right, switch 162 is closed to enable the reading electronics and circuits which are not shown. Further movement to the right allows switch 162 to open after reading is accomplished thereby again disabling the reading circuits. As the carriage nears its right-most position, switch 163 is closed cutting off power to motor 23 allowing the carriage to gently engage stop 48. All of the positions of the switches are adjustable so that they function at the proper time in the cycle. When authorization is given, the carriage 25 moves to the left to imprint. Switch 162 has no function during the imprint portion of the cycle. However, switch 163 must be closed to permit motor 22 to be operated. As the carriage moves leftward and closes switch 161, power is cut off to motor 22 allowing the carriage to gently engage the stop 47 thereby minimizing impact.

Figure 14:
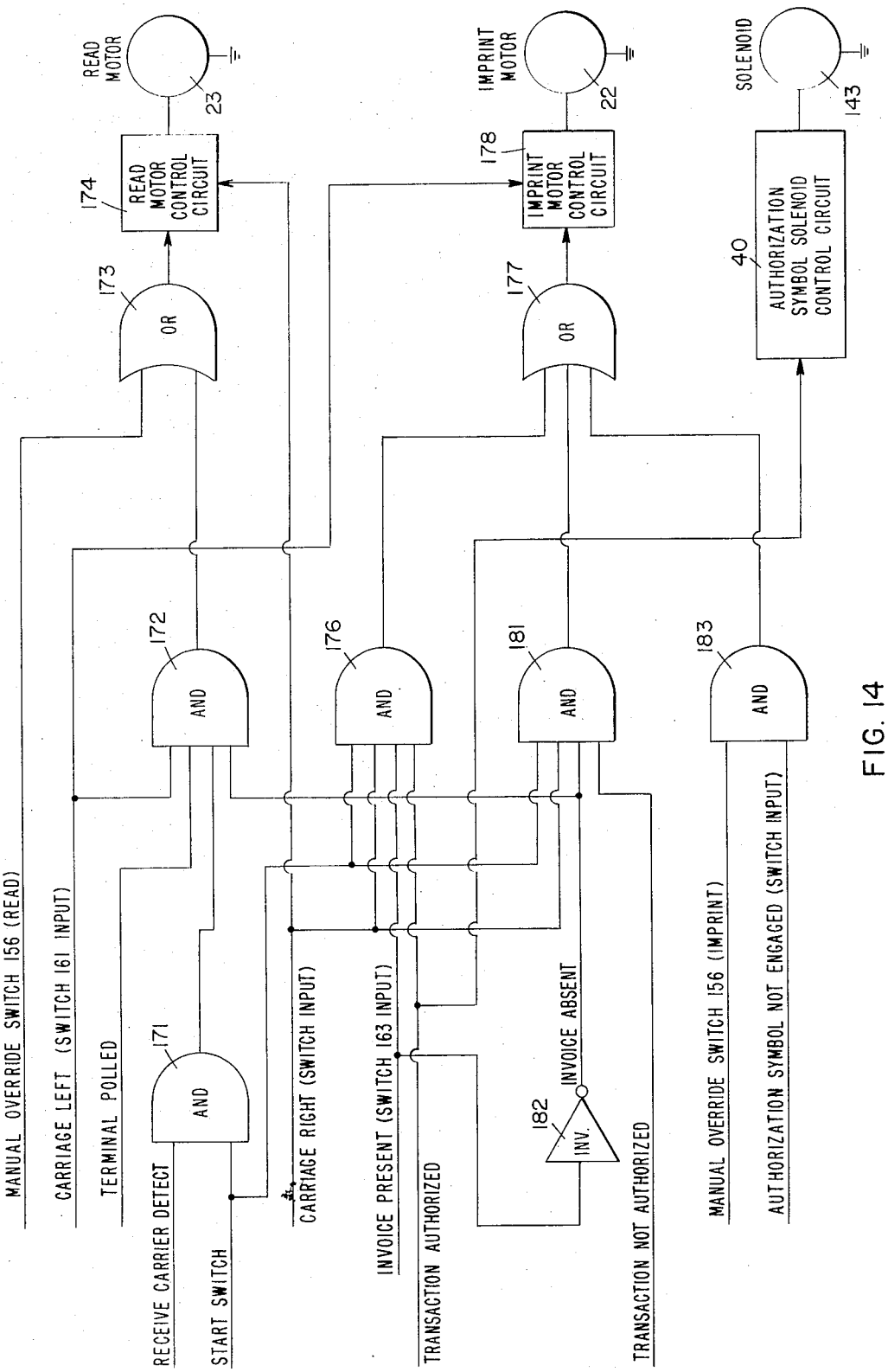
FIG. 14 is an electrical schematic diagram illustrating the operation of the apparatus.

Referring to FIG. 14, a simplified electrical schematic is shown to illustrate the operation of the apparatus. AND gate 171 is enabled when start switch 16 is pressed and when a carrier is detected on the line to the computer at the remote location. The output from AND gate 171 is applied to AND gate 172 which in turn is enabled when the carriage 25 is at the left as determined by switch 161 being closed, when switch 43 is opened by no invoice being inserted in the apparatus, and when the remote computer gives the signature or call number of the particular terminal. The output of AND gate 172 is applied to OR gate 173 which is enabled either by that signal or by the manual override switch 156. The output of OR gate 173 operates a read motor control circuit 174 which controls the operation of motor 23. When the carriage 25 is at the right, the data on the credit card has been read and transmitted, along with other data, to the remote computer. If the credit transaction is authorized, a signal is applied to an AND gate 176, which is enabled by that authorization when start switch 16 is pressed, when switch 163 is closed, and when the invoice is properly positioned closing switch 43. The output of gate 176 is applied to OR gate 177, the output of which operates an imprint motor control circuit 178 which operates and controls imprint motor 22. Additionally, the transaction authorization signal operates the authorization symbol imprinting assembly 40 so that an authorization symbol is automatically imprinted whenever the remote computer authorizes the transaction. If the transaction is not authorized, another signal is transmitted by the remote computer and applied to AND gate 181. When there is no authorization, you must be able to return the carriage to its start position, but ordinarily you do not want to imprint or permit an invoice to be imprinted. Thus, AND gate 181 can only be enabled when no invoice is present and switch 43 is opened. This is accomplished by inverter 182. Thus, gate 181 is enabled when the start switch 16 is closed, when switch 163 is closed by the carriage being positioned at the right, when the invoice is absent, and when the transaction is not authorized. In the event that telephone authorization is received, or for any other reason, the motor 22 can be operated by using manual over-ride switch 156 to enable AND gate 183. However, in this instance the authorization symbol imprinting assembly 40 cannot be engaged. There may be occasions when the remote computer may be down so that on line authorization cannot be obtained. Nevertheless, it is desirable to be able to use the apparatus as an imprinter. To do this, manual over-ride switch 156 can be used to enable OR gate 173 to operate motor 23 to move the carriage to the right. The invoice may then be inserted and switch 156 again closed to enable OR gate 177 to operate motor 22 and imprint the invoice. This eliminates the necessity of having a separate imprinter.

In operation, a credit card 32 will be inserted between the guides 34 onto the platen 39. The operator will then set the switches 14 identifying the card issuer and set the dollar amount switches 13 indicating the amount of the transaction. The operator then presses the start button 16 to initiate the reading portion of the cycle. As the carriage begins to move the imprinter roller 91 moves off of the cam 51 thereby locking the dollar amount switches 113 by preventing movement of the associated racks 112. This prevents the operator from changing the dollar amount of the transaction once the cycle of operation has begun. Additionally, once the reading cycle begins the credit card locking assembly 36 locks the credit card to the platen 39 so that is cannot be removed until completion of the cycle of operation. Before the carriage 25 begins to move, the read head assembly 26 is in its raised position and the imprinting roller is in its raised position where it will not make contact with the credit card or platen. At the beginning of motion of the carriage 25, the read head assembly 26 is lowered onto the credit card. Movement of the read head assembly 26 to its horizontal position is further assisted by spring 59 urging bracket 57 downwardly as shown in FIG. 9. As movement of the carriage 25 continues, the cam 65 closes switch 162 to enable the reading electronics. The tapered side 78 of the read head assembly 26 locates the leftmost embossed character of the credit card and guides the read head holder 72 onto the embossed characters to be read. Continued movement of the carriage brings the characters to be read into the recess 83 of the read head holder so that the read head 79 can read the embossed characters. As the carriage continues to move, the end 62 of pivot arm 61 engages cam 63 thereby pivoting the read head assembly 26 upwardly so that it does not contact the imprinting wheels 37 after reading is accomplished. As cam 65 moves past switch 162, it allows 162 to open, thus disabling the read electronics. As the carriage nears the completion of the reading portion of the cycle, the cam 65 closes switch 163 thereby de-energizing motor 23 allowing the carriage 25 to coast and gently engage the stop 48 thereby minimizing impact. Additionally, the arm 97 of actuator member 98 of the imprinter assembly 27 engages stop 99 which pivots the imprinting roller 91 downwardly in preparation for the imprinting portion of the cycle and also raises a cam portion 96 of the actuator member 98 to hold the read head assembly 26 in its raised position.

After the credit card is read, the account number, the amount of sale and other information is transmitted to a computer at a remote location for authorization. During the short interval, usually several seconds, the operator must wait for a signal to be received from the computer. The operator may place the sales invoice on the platen during this wait. This closes the switch 43. Before the imprinting of a sales invoice can be accomplished, an authorization signal must be transmitted to the apparatus to allow the carriage to move back to its starting position and imprint the sales invoice. If a "no authorization" signal is given, the carriage cannot be made to move from right to left by pushing start switch 16 because switch 43 is closed, indicating that an invoice is inserted on the platen. Thus, the invoice must be removed to allow the carriage to return to its start position in preparation for another transaction. Only if switch 43 is up indicating that no sales invoice is inserted on the platen, or if manual over-ride switch 156 is operated, can the carriage be made to traverse back to its starting position to allow the credit card 32 to be removed and another transaction to be run. If credit authorization is received, the operator can then imprint the sales invoice by pressing the start button to make the carriage move from right to left. Also, when an authorization signal is received, the authorization symbol mechanism 40 is actuated to raise the arm 141 so that the symbol 145 is level with the imprinting wheels 37. As the carriage moves in the imprinting portion of the cycle back to its original position, the imprinting roller 91 causes the information on the imprinting wheels 37 and 38, dealer plate 33 and credit card 32 to be imprinted on the sales invoice. As the carriage moves leftward, the cam 65 engages switch 161, which de-energizes motor 22 thereby again minimizing impact of the carriage against the stop 47. when the carriage returns to its left position, the imprinting roller 91 again engages cam 151, allowing the dollar amount switches to be unlocked for the next transaction. Additionally, the end 87 of lever 85 of read head assembly 26 engages stop 89 (FIG. 2) to return the read head holder 72 to its proper position and to tilt the read head assembly 26 upwardly to await the beginning of another transaction. Furthermore, the arm 97 of actuator member 98 engages the stop (not shown) on frame 52 to return the imprinting roller 97 to its raised position. At the end of the cycle the credit card lock 36 is de-energized, allowing the credit card to be removed from the platen. The full cycle of operation has now been completed and the apparatus and system have read a customer's credit card, approved the authorization of credit and imprinted a sales invoice, form set or other document without operator intervention. The operator then removes the imprinted sales invoice, copies the authorization code from display 19 on the keyboard onto the sales invoice and has the customer sign the invoice to fully complete the credit transaction. If desired, the operator could have copied the authorization number from display 19 onto the sales invoice prior to inserting the invoice onto the platen for imprinting. In any event, the display 19 stays on throughout and after the imprinting portion of the cycle to allow sufficient time to record the number. The display 19 is removed when start button 16 is pressed to initiate another cycle of operation.

It is to be understood that the above described embodiment is merely illustrative of applications of the principle of this invention and that numerous other arrangements and modifications may be made within the spirit and scope of the invention. For example, it is not necessary to drive the carriage with motors, but a hand operated machine could be built with appropriate interlocks to prevent imprinting an invoice without authorization. Also for example, a movable carriage may or may not be used, and instead the card may move relative to a reading station and then move into an imprinting station. Additionally, an electrical keyboard may be employed which may transmit certain data and/or set data imprinting wheels electromechanically or some other way. Alternatively, the data imprinting wheels may be set by means of receiving appropriate signals from a data processing or data transmission system.

What is claimed is:

1. Apparatus for reading cards having embossed data thereon and imprinting a document comprising:
   base means for receiving and holding a card;
   means for serially reading the embossed data on said card and for generating electrical signals corresponding to said embossed data;
   means for selecting variable data which can be imprinted on a document and for generating electrical signals corresponding to said variable data;
   means for transmitting said electrical signals corresponding to said embossed data and at least some of said variable data to a remote location;
   means for receiving a document with at least a portion thereof overlapping said card;
   means for imprinting the embossed data and selected variable data onto the document; and
   logic means responsive to both a predetermined authorization signal being received from said remote location and said document being in imprinting position for enabling imprinting of said document.

2. Apparatus as set forth in claim 1 wherein said reading means and said imprinting means are mounted to a carriage which is movable in a first direction to read and in a second direction to imprint.

3. Apparatus as set forth in claim 2 including means for positioning said read means over said card during movement in said first direction and pivoting said read means upwardly after said embossed data is read and holding said read means in that position during the remainder of movement in said first direction and during movement in said second direction.

4. Apparatus as set forth in claim 2 wherein said imprinting means includes an imprinting roller and means for moving said imprinting roller out of imprinting position during movement of said carriage in said first direction and for moving said imprinting roller into imprinting position during movement of said carrige in said second direction.

5. Apparatus as set forth in claim 2 including means responsive to initiation of movement in said first direction for preventing removal of said card until after an authorization signal is obtained and the document is imprinted.

6. Apparatus as set forth in claim 2 including means for locking said card to said base means in response to initiation of movement of said carriage in said first direction.

7. Apparatus as set forth in claim 6 wherein said locking means includes a clamping member connected to a solenoid, said solenoid being energized in response to initiation of movement of said carriage in said first direction to prevent removal of said card during movement of said carriage in said first and second directions.

8. Apparatus is set forth in claim 5 including means for holding said imprinting means out of engagement with said card during movement of said carriage in said first direction, and for urging said imprinting means into a printing position wherein a document is imprinted with the desired data during movement of said carriage in said carriage in said second direction.

9. Apparatus as set forth in claim 2 including means responsive to said predetermined authorization signal from said remote location for moving an authorization symbol into imprinting position to imprint said symbol on said document during movement of said carriage in said second direction.

10. Apparatus as set forth in claim 9 wherein said authorization symbol moving means includes a type symbol connected to a solenoid, said solenoid being energized in response to said predetermined authorization signal to move said type symbol into imprinting position.

11. Apparatus as set forth in claim 9 including means for locking said card to said base means in response to initiation of movement of said carriage in said first direction.

12. Apparatus as set forth in claim 1 wherein said read means includes a frame and a read head holder movable in said frame, said holder having a tapered recess formed in the bottom thereof for receiving said embossed data on said card and a tapered arm for positioning the read head holder to align and guide said embossed data into said recess, said read head holder having an opening therein for receiving and positioning a read head immediately over said recess, said read head being spring biased toward said recess and being movable perpendicularly with respect to the plane of said card.

13. Apparatus as set forth in claim 12 wherein said read head is mounted to prevent rotational movement relative to said read head holder.

14. Apparatus for reading cards having embossed data thereon and imprinting a document comprising:
   base means for holding a card in a predetermined position, said base means having a space for receiving a data plate having fixed embossed data thereon;
   a plurality of imprinting wheels mounted so that variable data can be set thereon for imprinting onto the document;
   means for moving said imprinting wheels to select the data for imprinting;
   carriage means for moving relative to said card;
   read means mounted to said carriage means for serially reading the embossed data on said card and for generating electrical signals corresponding to said embossed data;

means for transmitting said electrical signals corresponding to said embossed data and at least some of the variable data set on said imprinting wheels to a remote location;

means for positioning a document with at least a portion thereof overlapping said embossed data on said card;

imprinting means mounted to said carriage for contacting said document to imprint the data embossed on said card and said fixed data from the plate and variable data onto said document during movement of said carriage; and logic means responsive to a predetermined authorization signal from said remote location and to the proper positioning of said document over said card for enabling the carriage to move and imprint said document.

15. Apparatus as set forth in claim 14 wherein at least some of said imprinting wheels are for imprinting the dollar amount of a sale and including means responsive to movement of said carriage for locking said means for moving said dollar amount imprinting wheels.

16. Apparatus as set forth in claim 15 wherein said means for moving said dollar amount imprinting wheels includes a plurality of parallel racks and said locking means includes a bar mounted transversely to said racks and movable into engagement with the teeth of said racks to lock said racks.

17. Apparatus as set forth in claim 14 including means for raising said read means after said document is read to prevent contact with said imprinting wheels.

18. Apparatus as set forth in claim 14 wherein said logic means is responsive to a "no authorization" signal received from said remote location and to the absence of a document for allowing said carriage to move in said second direction without imprinting.

* * * * *